June 5, 1956 R. C. LOCKARD 2,749,382
FOIL STRIP WIRING SYSTEM
Filed Sept. 8, 1952 2 Sheets-Sheet 1
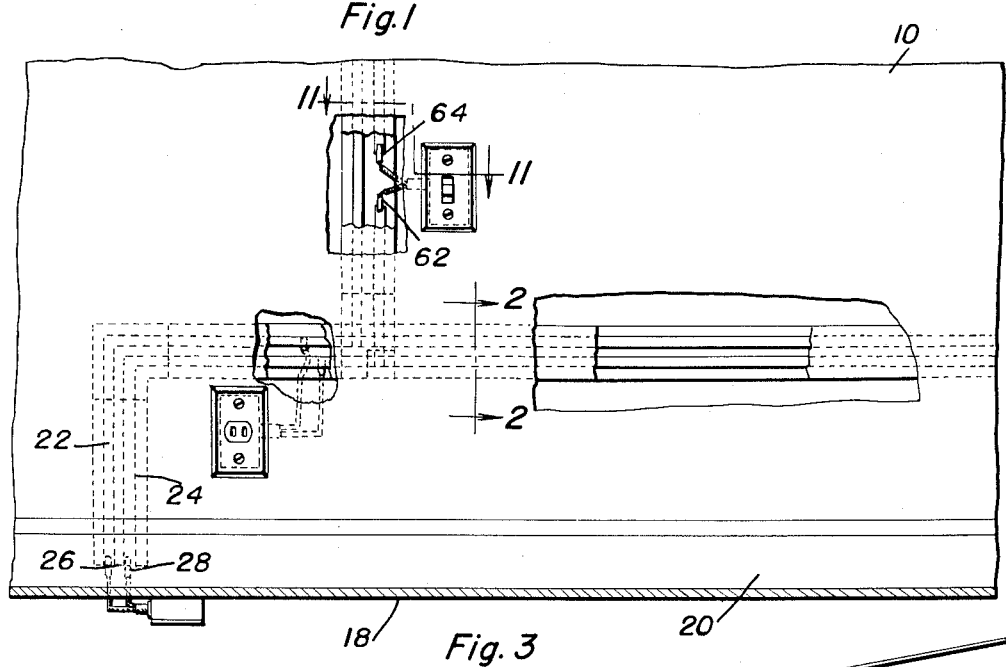
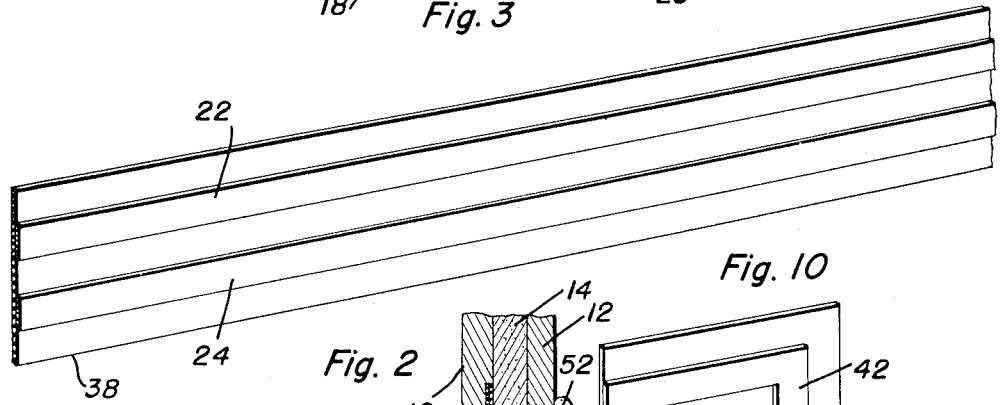
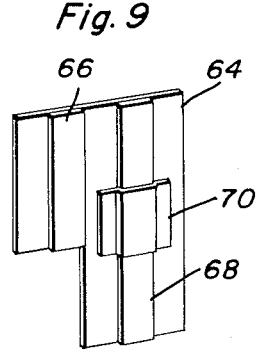
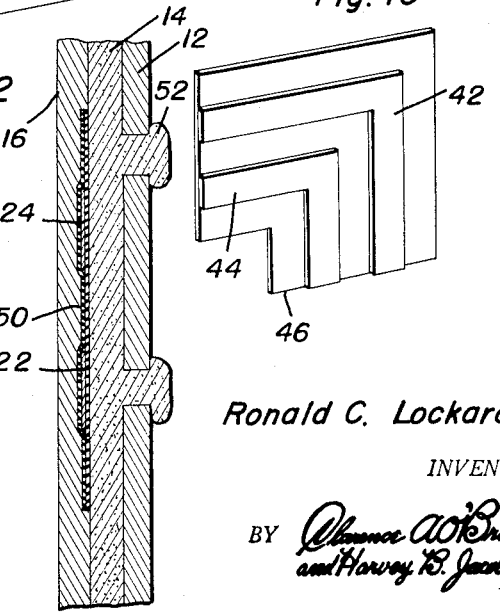
Ronald C. Lockard
INVENTOR.

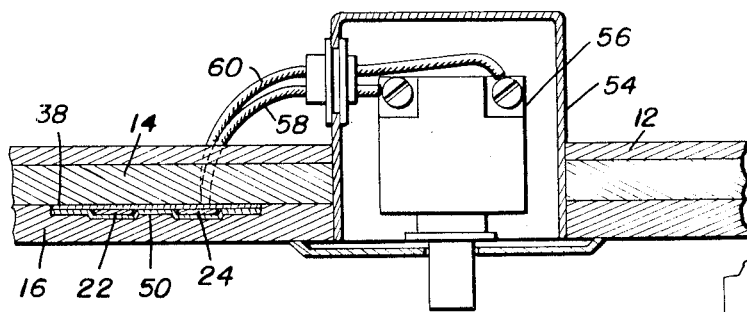
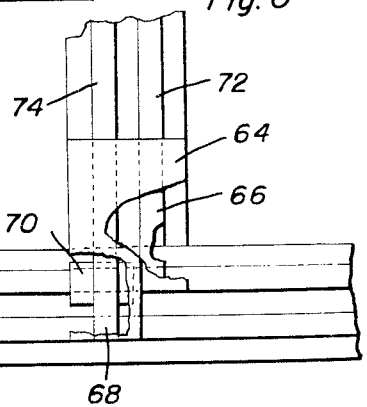
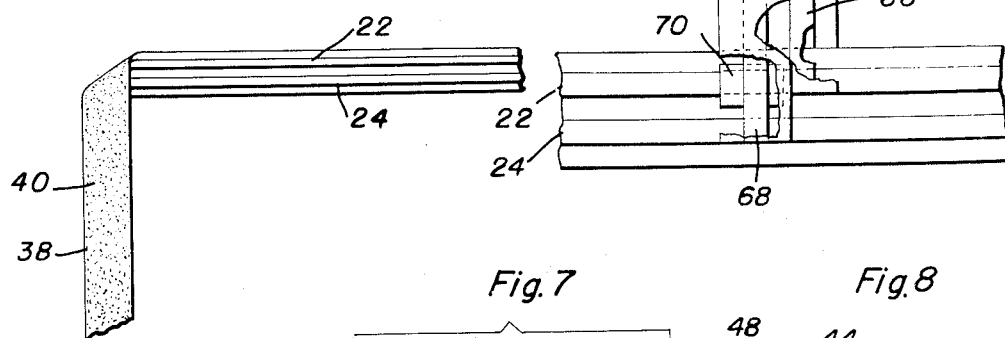
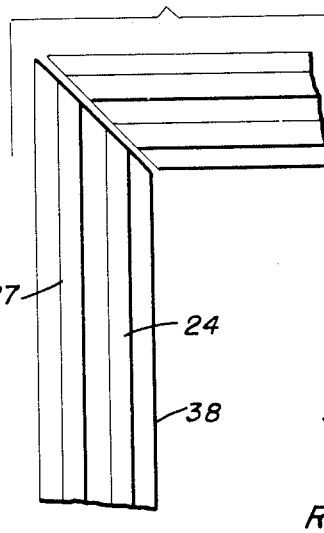
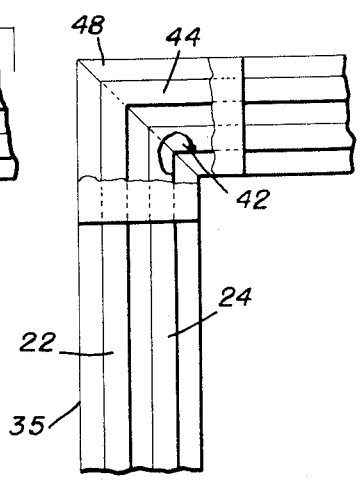
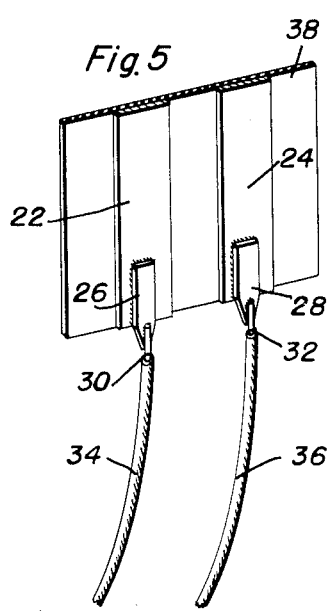

United States Patent Office 2,749,382
Patented June 5, 1956

2,749,382

FOIL STRIP WIRING SYSTEM

Ronald C. Lockard, Freeport, Pa.

Application September 8, 1952, Serial No. 308,461

1 Claim. (Cl. 174—71)

This invention relates to a wiring system and particularly to a wiring system utilizing foil strips embedded within a wall structure for conducting electrical currents therein.

In the construction of wiring systems it has heretofore been customary to provide a pair of wire conductors mounted in suitable housing members such as loom or conduit and mount these supporting structures at various points through the building providing outlet connections at various points where switches, plug-in connectors, lights or other devices are to be installed.

The present invention provides a wiring system eliminating the large amount of hardware and mounting the conductors directly into the wall structure such as the plaster or other coverings for the walls. The conductors themselves are constructed of flat metal foil such as aluminum foil and are preferably enclosed between electrical insulating sheets such as kraft paper or other suitable sheet insulating material.

Power is supplied to the foil conductors by means of ordinary wire conductors of the insulated type terminating in flat plate-like contacts which are secured preferably by soldering to the foil strips. These connections may be utilized for connecting power to the foil strips or by controlling power therefrom as by outlet connectors or controlling the conduction in the fold strips themselves as by means of wall switches.

It is accordingly an object of the invention to provide an improved wiring system.

It is a further object of the invention to provide a foil wiring system embedded in a wall structure.

It is a further object of the invention to provide an improved connection for applying current to embedded conductors.

It is a further object of the invention to provide improved joint structure for foil conductors.

It is a further object of the invention to provide an improved twin conductor utilizing a paper back and a pair of foil strips mounted thereon.

It is a further object of the invention to provide a convenient branch joint for utilizing with foil circuit conductors.

Other objects and many of the attendant advantages of the invention will be apparent from the following detailed description taken in conjunction with the accompanying drawing in which:

Figure 1 is a plan view of a wall section with parts broken away and in section showing the wiring system according to the invention;

Figure 2 is a cross section through a wiring section as applied in a plastered wall taken substantially on the plane indicated by the line 2—2 of Figure 1;

Figure 3 is a perspective view of a twin conductor according to the invention;

Figure 4 is a view showing the application of the twin conductors to a wall surface;

Figure 5 is an enlarged perspective showing the attachment of the power leads to the foil conductors;

Figure 6 is an enlarged view showing the attachment of a branch circuit;

Figure 7 is a view showing the arrangement of the wiring strips to turn a corner;

Figure 8 is an enlarged view of a finished corner;

Figure 9 is an enlarged perspective of the connector for joining the branch circuit;

Figure 10 is an enlarged perspective view of the corner connector; and

Figure 11 is an enlarged view of the attachment of a switch in the system taken substantially on the plane indicated by the line 11—11 of Figure 1.

In the exemplary embodiment of the invention a wall section 10 constructed of lath 12 a rough coat 14 and a finished coat 16 extends above a floor 18 and has a finish board or mop board 20.

The wiring system according to the invention includes a pair of foil strips 22 and 24 which are preferably embedded in the wall between the rough plaster 14 and the finished coat 16. The ends of the foil conductors 22 and 24 extend in proximity to the floor 18 and have power connections made thereto by means of the plates 26 and 28 which are preferably soldered or otherwise permanently connected thereto and which are connected to the wire conductors 30 and 32 having the usual insulating coverings 34 and 36 thereon.

Preferably the conductors 22 and 24 are mounted on a strip of suitable insulating material such as kraft paper 38. The back of the strip 38 is provided with a gummed surface 40 so that the gummed paper 38 may be readily attached to the rough coat 14 and carry the conductors 22 and 24 therewith. Angular construction of the power line in the wall is provided by mitering the conductors 22 and 24 adjoining the mitered corners in abutting relation with angular members 42 and 44 lying in overlapping relation to the mitered abutting ends. Preferably the angular members 42 and 44 are mounted on an angular strip of paper such as kraft paper 46. The entire corner including the conducting angles 42 and 44 is placed in covering relation to the abutting corners and secured in place thereon.

It is frequently desirable to cover the conductors 22 and 24 with an insulating cover 50. The covering 50 is preferably applied after the conductors have been put in place and completely protects the conductors from the second coat such as the finished coat 16 of plastering material. While the device is shown in a plastered wall having a lath backing with a rough coat as shown at 52 it is obvious that the device could be applied to various types of walls such as a plaster board wall having a finished coat thereon or any other suitable type of wall material which can be applied in plies.

An outlet connection such as plug-in outlets are provided by providing outlet boxes in the wall adjacent to the foil conductors and applying metallic conductors having flat ends similar to the plates 26 and 28 connected into the boxes. The boxes 54 may be mounted in the usual ways and such devices such as switches 56 may be mounted therein in the usual manner. The conductors 58 and 60 extending therefrom and ending in ends 62 and 64 which engage with a discontinuity in one of the foil conductors so that the switch 56 may control the flow of current therein.

To construct a branch circuit onto the main circuit, a strip of the twin conductor 28 with the conductors 72 and 74 is arranged in abutting relation to the first twin conductor and a connector comprising an insulating sheet back 64 is provided with a short foil strip 66 and a relatively longer foil strip 68. The longer foil strip 68 being provided with an insulator 70 adjacent the end of the shorter foil strip 66. The connector device is applied so that the strips 66 and 68 overlap the ends of the foil strips on the abutting section and extend across the foil strips 22 and 24. The shorter strip terminating on the foil strip 22 and the longer strip terminating on the spaced alternate foil strip 24 with the insulator 70 underlying the foil strip 68 and the alternate conductor 22 so that current is conducted from the strips 22 and 24 to the strips 72 and 74.

In the insulation of the wiring system according to the invention, the foil strips 22 and 24 will be mounted on the intermediate portion of the wall before the finished coat is applied and the connection such as the power connections 26 and 28 will be made thereto while the wall boxes and outlet boxes will be mounted in the wall and the terminal connections such as 62 and 64 made thereto. Preferably the foil strips will be covered with the protective insulating cover 50 after which the finished coat 16 will be applied and the entire structure will be completely built into a wall on a portion thereof. It has been found in practice that an aluminum foil strip one-half inch wide has the current carrying capacity of a number ten copper wire and when mounted in the wall structure is substantially indestructible.

For purposes of illustration a particular embodiment of the invention has been shown and described according to the best present understanding thereof. It will be apparent that changes and modifications can be made therein without departing from the true spirit of the invention.

Having described the invention, what is claimed as new is:

A connection for a wiring system comprising a sheet of insulating material, a pair of spaced apart parallel conductive foil strips secured on said sheet of insulating material, a short conductive foil strip extending into contact with the nearest foil strip of said pair of foil strips, an insulator placed over an adjoining portion of said nearest foil strip, another conductive foil strip extending over said insulator and contacting the remote foil strip of said pair of foil strips, and another sheet of insulating material overlying all of said foil strips.

References Cited in the file of this patent

UNITED STATES PATENTS

| | | |
|---|---|---|
| 303,735 | Jackson | Aug. 19, 1884 |
| 1,559,380 | Roe | Oct. 27, 1925 |
| 1,791,666 | Finn | Feb. 10, 1931 |
| 1,815,741 | Richardson | July 21, 1931 |
| 1,879,198 | Greis | Sept. 27, 1932 |
| 2,256,489 | Nazett et al. | Sept. 23, 1941 |
| 2,611,800 | Naughton | Sept. 23, 1952 |

FOREIGN PATENTS

| | | |
|---|---|---|
| 24,533 of 1908 | Great Britain | Nov. 15, 1909 |
| 633,050 | Germany | July 18, 1936 |
| 157,329 | Austria | Oct. 25, 1939 |